United States Patent [19]

Dirks et al.

[11] 4,121,807

[45] Oct. 24, 1978

[54] PROCESS FOR PREPARING LOW-COST COPOLYMERS FROM ACRYLONITRILE AND CRUDE INDENE

[75] Inventors: Gary W. Dirks, Scottsdale, Ariz.; George S. Li, Aurora; Irving Rosen, Warrensville Heights, both of Ohio

[73] Assignee: The Standard Oil Company, Cleveland, Ohio

[21] Appl. No.: 790,344

[22] Filed: Apr. 25, 1977

[51] Int. Cl.² .................... C08F 2/00; C08F 244/00; C08F 32/08
[52] U.S. Cl. ...................... 526/76; 526/75; 526/267; 526/280
[58] Field of Search ................... 526/75, 76, 267, 280

[56] References Cited

U.S. PATENT DOCUMENTS

| | | | |
|---|---|---|---|
| 2,856,389 | 10/1958 | Fusco et al. | 526/280 |
| 3,661,871 | 5/1972 | Walmsley et al. | 526/280 |
| 3,799,913 | 3/1974 | Wheeler et al. | 526/280 |
| 3,926,926 | 12/1975 | Li et al. | 526/267 |
| 3,997,709 | 12/1976 | Aziz et al. | 526/280 |

*Primary Examiner*—Herbert J. Lilling
*Attorney, Agent, or Firm*—John F. Jones; Larry W. Evans

[57] ABSTRACT

Polymeric compositions having high heat-distortion temperatures which function as gas and vapor barrier materials which are composed of an olefinically unsaturated nitrile, such as acrylonitrile, and indene are produced by the copolymerization of said olefinically unsaturated nitrile and crude indene which can be derived from various sources.

7 Claims, No Drawings

PROCESS FOR PREPARING LOW-COST COPOLYMERS FROM ACRYLONITRILE AND CRUDE INDENE

The present invention relates to a novel process for producing polymeric compositions which have low permeability to gases and vapors, and more particularly pertains to the process for producing copolymers of an olefinically unsaturated nitrile and indene which includes use of a crude source of indene which needs no purification.

Copolymers of acrylonitrile and indene have been previously described and claimed in U.S. Pat. No. 3,926,926 to George S. Li et al.

The present invention embodies a novel process for preparing the type of copolymers described in U.S. Pat. No. 3,926,926. These copolymers are prepared by polymerizing a major porportion by weight of an olefinically unsaturated nitrile, such as acrylonitrile, and a minor proportion by weight of indene.

The olefinically unsaturated nitriles useful in the present invention are the alpha, beta-olefinically unsaturated mononitriles having the structure

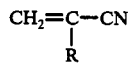

wherein R is hydrogen, a lower alkyl group having from 1 to 4 carbon atoms, or a halogen. Such compounds include acrylonitrile, alpha-chloroacrylonitrile, alpha-fluoroacrylonitrile, methacrylonitrile, ethacrylonitrile, and the like. The most preferred olefinically unsaturated nitrile is acrylonitrile.

Crude indene (1-H-indene) is used as a source of indene in this invention. Crude sources of indene include certain coal-tar fractions and many petroleum refinery hydrocarbon streams, the only requirement being that the stream not contain any significant amounts of readily polymerizable monomers, i.e., styrene, butadiene, isoprene, isobutylene, propylene, ethylene, etc., and that the stream contain at least about 5% by weight of indene and up to about 50% by weight of indene. The crude source of indene also should not contain any significant amount of polymerization inhibitors, chain-transfer agents, and the like, which would interfere with the copolymerization reaction between acrylonitrile and indene. The most preferred sources of crude indene are petroleum refinery-derived mixtures.

It is indeed unexpected that a refinery stream containing as little as about 5% of indene can be used as a source of indene in the formation of acrylonitrile-indene copolymers. The remainder of the refinery stream after indene removal can be readily recovered and used for other well-known purposes such as for fuel, lubricants, etc., as is well known to those skilled in the art. From another perspective, the instant process is useful in removal of indene from refinery streams containing small amounts of indene in them.

The polymers made by the copolymerization of an olefinically unsaturated nitrile and crude indene can generally be made using any of the known techniques of copolymerization including the bulk polymerization, solution polymerization, and emulsion or suspension polymerization techniques by batch, continuous or intermittent addition of the monomers and other components. The preferred method is an aqueous emulsion or suspension polymerization to produce a latex or suspension of the desired copolymer.

The polymerization process of this invention is preferably carried out in an aqueous medium in the presence of an emulsifier or suspending agent and a free-radical generating polymerization initiator at a temperature in the range of from about 0° to 100° C. in the substantial absence of molecular oxygen. It is not necessary to use a molecular-weight modifier in the polymerization reaction to control the molecular weight of the resulting polymer.

The preferred polymers to be prepared by the process of this invention are those resulting from the polymerization of (A) at least 50% by weight of an olefinic nitrile having the structure

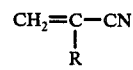

wherein R has the foregoing designation and (B) up to 50% by weight based on the combined weight of (A) and (B) of indene.

More specifically, this invention can be illustrated by the polymerization of a mixture of a major proportion of acrylonitrile and a minor proportion of indene.

Preferably, the acrylonitrile-indene monomer used in the polymerization reaction should contain from 50 to 90% by weight of acrylonitrile based on the combined weight of acrylonitrile and indene, and more preferably from about 60 to 90% by weight of acrylonitrile and correspondingly from about 10 to 40% by weight of indene should be used in the polymerization reaction.

The polymers produced by the process of this invention are easily processable, thermoplastic resinous materials which can be readily thermoformed into a wide variety of useful articles in any of the conventional ways employed with known thermoplastic polymeric materials such as by extrusion, milling, molding, drawing, blowing, etc., all well known to those of ordinary skill in the art.

In the following illustrative examples, the amounts of ingredients are expressed in parts by weight unless otherwise indicated.

EXAMPLE 1

A copolymer of acrylonitrile and indene was prepared in a bulk polumerization of 70 parts by weight of acrylonitrile and 30 parts by weight (active) of indene in an 18% solution of an indene-hydrocarbon mixture obtained from high-severity cracking of gas oil. Thus crude indenehydrocarbon solution had a boiling range of 300°–440° F. As polymerization initiator, there was used 0.47 part of azobisisobutyronitrile. The polymerization was carried out under nitrogen at 60° C. for 45 hours. The resulting gel was broken up in methanol. The solid polymer when dried was found to have the following properties:

| | |
|---|---|
| ASTM heat-distortion temperature | 100° C |
| flexural strength | 2.1 × 10³ psi |
| flexural modulus | 4.32 × 10⁵ psi |
| tensile strength | 3.2 × 10³ psi |
| Rockwell hardness | 85 "D" scale |

EXAMPLE 2

A copolymer of acrylonitrile and indene was prepared according to the procedure of Example 1 using a C$_9$ fraction obtained by thermal cracking of crude-light petroleum to produce ethylene and residual oil (boiling point >200° F.) which oil was further thermally cracked at 500°–600° F. to remove cyclopentadiene and contained 35% by weight of indene in it. The resulting copolymer was found to have the following properties:

| | |
|---|---|
| ASTM heat-distortion temperature | 118° C |
| flexural strength | 3.1 × 10$^3$ psi |
| flexural modulus | 5.12 × 10$^5$ psi |
| Rockwell hardness | 88 "D" scale |
| melt index at 200° C and 6 minutes | 16.8 grams |

EXAMPLE 3

A copolymer of acrylonitrile and indene was prepared in aqueous suspension using the following ingredients:

| Ingredient | Parts |
|---|---|
| acrylonitrile | 70 |
| indene (18% active-cracked gas oil) | 30 |
| water | 700 |
| hydroxyethyl cellulose | 0.47 |
| 2,4-dimethyl valeronitrile | 1.41 |
| azobisisobutyronitrile | 0.47 |

The polymerization was carried out at 60° C. with agitation under nitrogen and the 2,4-dimethyl valeronitrile was added in ⅓ increments at the beginning, after 3 hours and after 20 hours. The azobisisobutyronitrile was added after 28 hours. A total polymerization time of 33 hours was employed. The resulting resin was isolated by filtration and was dried. The dry resin was found to have the following properties:

| | |
|---|---|
| water vapor transmission | 6.4 gm-mil/100 inches$^2$/24 hours/atmosphere |
| % light transmission | 77.8 |
| yellowness index | 39.1 |
| % haze | 34.7 |

The last three properties were determined on samples of resin which had been in the Brabender plasticorder for 10 minutes at 230° C. and 35 rpm.

EXAMPLE 4

The procedure of Example 3 was repeated using the following ingredients:

| Ingredient | Parts |
|---|---|
| acrylonitrile | 85 |
| indene (18% active-cracked gas oil) | 15 |
| hydroxyethyl cellulose | 0.33 |
| water | 500 |
| azobisisobutyronitrile | 1.0 |

The resulting polymer was found to have the following properties:

| | |
|---|---|
| ASTM heat-distortion temperature | 100° C |
| flexural strength | 3.6 × 10$^3$ psi |
| flexural modulus | 5.23 × 10$^5$ psi |
| tensile strength | 1.2 × 10$^3$ psi |
| Rockwell hardness | 86 "D" scale |

EXAMPLE 5

A repeat of Example 4 using 90 parts of acrylonitrile and 10 parts of indene (active) gave a resin having the following properties:

| | |
|---|---|
| ASTM heat-distortion temperature | 105° C |
| flexural strength | 4.0 × 10$^3$ psi |
| flexural modulus | 4.95 × 10$^5$ psi |
| tensile strength | 2.3 × 10$^3$ psi |
| Rockwell hardness | 88 "D" scale |

We claim:
1. The process for preparing copolymers comprising polymerizing in the presence of a free-radical generating polymerization initiator at a temperature in the range of from about 0° to 100° C. in the substantial absence of molecular oxygen (A) from 50 to 90% by weight of an olefinic nitrile having the structure

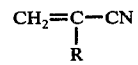

wherein R is hydrogen, a lower alkyl group having from 1 to 4 carbon atoms, or a halogen, and (B) from 10 to 50% by weight based on the combined weight of (A) plus (B) of indene wherein indene is in a crude-hydrocarbon solution containing from about 5 to 50% by weight of indene and wherein said crude-hydrocarbon solution contains no significant amounts of readily polymerizable monomers including styrene, butadiene, isoprene, isobutylene, propylene, and ethylene.

2. The process of claim 1 carried out in an aqueous medium.

3. The process of claim 2 wherein (A) is acrylonitrile.

4. The process of claim 3 wherein (A) is present in from 60 to 90% by weight and (B) is present in from 10 to 40% by weight.

5. The process of claim 4 wherein indene is present in a hydrocarbon solution produced in a petroleum oil refinery by the cracking of gas oil.

6. The process of claim 4 wherein the indene is present in a hydrocarbon solution which remains from the thermal cracking of crude-light petroleum and removal of ethylene followed by further thermal cracking and removal of cyclopentadiene.

7. The process of claim 4 wherein the indene is present in a solution derived from coal tar.

* * * * *